Patented Jan. 7, 1947

2,413,931

UNITED STATES PATENT OFFICE 2,413,931

PRESSURE-SENSITIVE ADHESIVE FABRICS

Gelu Stoeff Stamatoff, Rutherford, N. J., assignor to E. I. du Pont de Nemours & Company, Wilmington, Del., a corporation of Delaware No Drawing. Application August 9, 1943,
Serial No. 497,973

4 Claims. (Cl. 117—122)

This invention relates to pressure-sensitive adhesive fabrics, that is, adhesive tape and sheeting, and, more particularly, to an improved adhesive for use in making such products.

Pressure-sensitive adhesive fabrics comprise essentially a backing material, usually pliable, and deposited thereon an adhesive coating. The backing material may be, for example, a textile fabric or paper, or a film of regenerated cellulose or other derivative of cellulose. The coating on this backing is of such tacky or adhesive quality that, when it is brought into contact with a solid surface and pressed or rubbed against it, a firm adherence takes place without the assistance of heat or solvent.

The adhesive coating in these adhesive fabrics must, of course, adhere more strongly to its backing than to the smooth surfaces to which it may be applied by the use of pressure. Further, particularly where these products are used for the temporary protection of delicate surfaces, the coherence of the adhesive coating must be stronger than its adherence to the surfaces to which it may be applied, so that the adhesive fabric may be cleanly stripped from the surface without leaving any part of the adhesive coating thereon.

An object of the present invention is to provide improved pressure-sensitive adhesive fabrics. A further object is to provide such adhesive fabrics in which the backing material presents a smooth dense surface such as is the case with films of regenerated cellulose or other derivatives of cellulose. A further object is to provide such adhesive fabrics which are inherently transparent, substantially free from color, and which will adhere permanently to a surface against the deteriorating influences of moisture and sunlight and the oxidizing influence of air. Further objects are to provide pressure-sensitive adhesive fabrics especially adapted for household use and for application to glass to prevent its shattering when broken by concussion, in both of which applications a colorless and transparent product is preferable, and for the temporary protection of delicate surfaces for which latter purpose the appearance of the adhesive fabric is usually of secondary importance. Other objects will be apparent from the description of the invention given hereinafter.

The above objects are accomplished according to the present invention by depositing on a backing material a coating substantially consisting of 100 parts, by weight, of a resin base comprising a polyvinyl butyral resin having a content of 0%–5% polyvinyl ester and 8%–13% polyvinyl alcohol, and between 67 and 230 parts of an at least semi-active plasticizer for said resin, the plasticizer being a solvent for said resin below 45° C. Preferably an active plasticizer is employed and is used in the proportion of 100 to 150 parts per 100 parts of the resin. The resin base may be the polyvinyl butyral resin alone or this resin may be replaced in part by a resinous adjuvant as will be more fully discussed hereinafter.

The adhesive fabrics of the present invention may employ a backing material of cellulosic film, paper, textile fabric, or the like.

The polyvinyl butyral resins are made from polyvinyl esters, usually polyvinyl acetate, by a process of hydrolysis which converts the polyvinyl ester into polyvinyl alcohol, and of condensation with butyraldehyde which converts the polyvinyl alcohol into polyvinyl butyral. As is known in the art, neither of these reactions is ordinarily carried out to completion and the characteristics of the resulting polyvinyl butyral resin are determined in considerable measure by its constitution in terms of the percentages of residual polyvinyl ester, unconverted polyvinyl alcohol, and polyvinyl butyral which go to make up its macromolecules.

Commercially, these polyvinyl butyral resins are best known for their use as a major ingredient of interlayer sheeting in safety glass but, despite recognition of the general qualitative fact of the adhesive character of these resins, this has not led heretofore to any general use of such resins as adhesives to meet the specialized requirements of pressure-sensitive tape and sheeting. It has now been discovered that polyvinyl resins falling within the definition given above and when compounded in proportions within a definite range with the herein considered plasticizers, are peculiarly well suited for this use. The polyvinyl butyral resins operative in the present invention are distinguished by their low content of unconverted polyvinyl alcohol, between 8%–13%, from the polyvinyl butyral resins which have been used commercially in safety glass interlayer sheeting.

The viscosity of the polyvinyl butyral resin to be used in these adhesive compositions is not of prime importance. Within a range of 20 to 70 centipoises, as measured in a 5% solution in ethyl alcohol at room temperature, the effect of the viscosity of the resin is negligible, and resins of viscosities considerably outside this range will be operative.

The polyvinyl butyral resin forming the resin base of the adhesive compositions may be partially replaced by certain resinous adjuvants including polyvinyl butyral resin of safety-glass type having a polyvinyl alcohol content of 17%-21%, wood rosin, and polyvinyl acetate These adjuvants can be used to replace up to 50% of the polyvinyl butyral resin except in the case of wood rosin where a practical upper limit on the proportion of wood rosin is about 35% of the polyvinyl butyral resin; further increasing the proportion of wood rosin tends to give an adhesive coating which is excessively soft and too strongly adherent toward the backing of an adjacent turn of the adhesive fabric on a roll, for example.

The plasticizers to be used in the adhesive compositions of the present invention are all characterized by being solvents for the polyvinyl butyral resin below 45° C. Conveniently, this solubility characteristic may be determined by mixing 1 gram of the polyvinyl butyral resin and 25 cc. of the plasticizer in a test tube of 1 inch inside diameter with heating until a clear and homogeneous mixture is obtained. This is then allowed to cool with stirring by an ordinary laboratory thermometer. If, when the temperature drops below 45° C., the mixture remains sufficiently clear so that the mercury column of the thermometer is visible through the mixture, then the plasticizer may be regarded as a solvent for the resin for the purposes of this invention.

The plasticizer should also be at least a semi-active plasticizer for the resin and, preferably, an active plasticizer for the resin. For present purposes, this is determined by making a sheet composed of 30%, by weight, of the plasticizer and 70% of the polyvinyl butyral resin, volatile solvent being substantially absent. If the sheet is self-adhesive at ordinary temperature, i. e., two smooth surfaces though lightly pressed together adhere strongly to each other, the plasticizer is an active plasticizer for the resin. If the sheet is found to be tacky but not self-adhesive, the plasticizer is a semi-active plasticizer for the resin.

In addition to meeting the two requirements outlined above, a plasticizer will be selected with due consideration to the customary criteria by which those skilled in the art judge plasticizers. That is, the plasticizer should be one that will not tend to exude from a mixture with the polyvinyl butyral resin in the proportion proposed to be used, and it will also be acceptable with respect to color, stability, sufficiently low volatility, chemical inertness, and freedom from objectionable color.

The plasticizer may be a mixture of two or more compounds or may be a single compound. When a semi-active plasticizer is to be used, it is preferred to use it in combination with a substantial proportion of an active plasticizer although a semi-active plasticizer alone is operative in the invention.

Among the active plasticizers suitable for use in the present invention may be mentioned the following: dibutyl phthalate, diethyl phthalate, dibutyl sebacate, dibutyl adipate, dibutyl azelate and castor oil. A suitable semi-active plasticizer is hydrogenated methyl abietate.

The proportion of plasticizer to be used in the adhesive composition is predicated upon the resin base regardless of whether that is entirely polyvinyl butyral resin of the low polyvinyl alcohol content or is a combination of that resin with one of the resinous adjuvants heretofore discussed. The operative range of plasticizer lies between about 67 and 230 parts per 100 parts of resin base and a selection within this range will be made for an adhesive of optimum properties through consideration of the characteristics desired in the pressure-sensitive product, the choice of plasticizer because the content of plasticizer will usually be larger for a semi-active than for an active plasticizer, and the temperature to which the product is to be exposed in service, the lower end of the range preferably being avoided when the temperature of service is low and the higher end when this temperature is high. As a practical matter, it has been found that a range of 100 to 150 parts of plasticizer for 100 parts of resin base is to be preferred in most instances.

The manner of application of the adhesive composition to the backing material does not form an essential part of the present invention. To a base of paper, textile fabric, or cellulosic film, the adhesive mixture may be applied, while heated to an adequately soft and workable condition, by means of friction rolls or a spreader knife. It is preferred to apply the composition with the assistance of a suitable solvent by dispersing the adhesive composition ingredients in the solvent to form an adequately mobile dope and applying this to the backing by an appropriate coating equipment; thereafter, of course, the volatile solvent must be removed to a reasonable degree.

The following examples in which all proportions are given by weight unless otherwise stated, illustrate specific embodiments of the present invention.

*Example I*

Upon a continuous strip of regenerated cellulose film is applied a coating of a solution made up of:

| | Parts |
|---|---|
| Polyvinyl butyral resin of constitution | 100 |
|     Polyvinyl acetate_____per cent__ 1.0 | |
|     Polyvinyl alcohol_____do____ 12.0 | |
|     Polyvinyl butyral_____do____ 87.0 | |
| Dibutyl phthalate | 100 |
| Ethyl alcohol (2B denatured) | 650 |

The coating is dried in air at 40° C.–50° C. Its thickness is then 0.0010 to 0.0015 inch. The pressure-sensitive tape thus made is colorless and substantially transparent and it may be rolled up upon itself and then unrolled without damage. By application of light pressure at room temperature, it may be caused to adhere firmly to glass, polymethyl methacrylate sheets, paper, wood, and metal. It can, however, be stripped again from such surfaces which are smooth and inert but from rough and porous surfaces such as uncoated paper and cloth, or from surfaces which are attacked by the plasticizer which it contains, it cannot, of course, be stripped perfectly.

*Example II*

Pressure-sensitive adhesive tape is made by the procedure set forth in Example I but using a solution consisting of:

| | Parts |
|---|---|
| Polyvinyl butyral resin of constitution | 100 |
|     Polyvinyl acetate_____per cent__ 0.5 | |
|     Polyvinyl alcohol_____do____ 13.0 | |
|     Polyvinyl butyral_____do____ 86.5 | |
| Dibutyl phthalate | 67 |
| Ethyl alcohol | 500 |

Example III

The following composition is used for coating a continuous strip of regenerated cellulose as in Example I:

| | Parts |
|---|---|
| Polyvinyl butyral resin as in Example I | 100 |
| Castor oil | 167 |
| Ethyl alcohol | 400 |

Example IV

The following composition is used to coat a continuous strip of regenerated cellulose film as in Example I:

| | Parts |
|---|---|
| Polyvinyl butyral resin as in Example I | 100 |
| Dibutyl phthalate | 50 |
| Castor oil | 75 |
| Methyl acetate | 280 |
| Methanol | 20 |

The solvent mixture of methyl acetate and methanol used in this example is more rapidly removable than the ethyl alcohol of the previous examples and in that respect advantageous.

Paper coated on one side with an adhesive deposited by the solution of Example IV is useful as a masking paper for the protection of the smooth surfaces of polymethyl methacrylate sheeting during the handling or shipment thereof or during the fabrication of aircraft enclosures, and the like, from such sheeting, and for the protection of such enclosures during shipment and assembly. The paper may be readily stripped cleanly from the surface of the resin when it is no longer needed.

Example V

A backing material is coated with the following adhesive composition:

| | Parts |
|---|---|
| Polyvinyl butyral resin of constitution | 100 |
|     Polyvinyl acetate per cent | 0.6 |
|     Polyvinyl alcohol do | 12.1 |
|     Polyvinyl butyral do | 87.3 |
| Dibutyl sebacate | 50 |
| Hydrogenated methyl abietate ("Hercolyn") | 50 |
| Ethyl alcohol | 400 |

Example VI

The following adhesive composition is used for coating a backing material in making pressure-sensitive adhesive fabrics:

| | Parts |
|---|---|
| Polyvinyl butyral resin of constitution | 100 |
|     Polyvinyl acetate per cent | 0.9 |
|     Polyvinyl alcohol do | 12.9 |
|     Polyvinyl butyral do | 86.2 |
| Dibutyl phthalate | 50 |
| Hydrogenated methyl abietate ("Hercolyn") | 50 |
| Ethyl alcohol | 486 |

Example VII

The following adhesive composition is used for coating a backing material in making pressure-sensitive adhesive fabrics:

| | Parts |
|---|---|
| Polyvinyl butyral resin as in Example I | 80 |
| Polyvinyl butyral resin (safety-glass type) of constitution | 20 |
|     Polyvinyl acetate per cent | 1 |
|     Polyvinyl alcohol do | 19 |
|     Polyvinyl butyral do | 80 |
| Dibutyl phthalate | 100 |
| Ethyl alcohol | 600 |

Example VIII

The following adhesive composition is used for coating a backing material in making pressure-sensitive adhesive fabrics:

| | Parts |
|---|---|
| Polyvinyl butyral resin as in Example I | 70 |
| Polyvinyl acetate (viscosity 40 cps. in 5% solution in dioxane at room temp.) | 30 |
| Dibutyl phthalate | 100 |
| Ethyl alcohol | 370 |

Example IX

The following adhesive composition is used for coating a backing material in making pressure-sensitive adhesive fabrics:

| | Parts |
|---|---|
| Polyvinyl butyral resin of constitution | 83 |
|     Polyvinyl acetate per cent | 0.5 |
|     Polyvinyl alcohol do | 12.5 |
|     Polyvinyl butyral do | 87.0 |
| Wood rosin ("Galex" W100) | 17 |
| Dibutyl phthalate | 83 |
| Ethyl alcohol | 500 |

It will be understood that the above Examples are merely illustrative and that the invention broadly comprises a pressure-sensitive adhesive fabric consisting of a backing material and deposited thereon an adhesive coating of 100 parts of a resin base comprising a polyvinyl butyral resin as hereinbefore defined and from 67 to 230 parts of an at least semi-active plasticizer which is a solvent for the resin below 45° C.

While a desirable feature of the adhesive compositions of this invention is their substantial transparency and freedom from color, which makes them especially desirable for the preparation of transparent pressure-sensitive adhesive fabrics having a backing material of regenerated cellulose film or other cellulose derivatives, it is entirely feasible to modify the adhesive compositions by incorporation of suitable fillers, pigments, or soluble coloring ingredients.

The present adhesive composition is anchored satisfactorily, firmly and permanently to the smooth and dense surface of films of regenerated cellulose and other derivatives of cellulose so that it is not necessary to provide a preliminary primer coat upon the latter in order to improve the anchorage. When regenerated cellulose film is used as the backing, it may be of the plain, uncoated type or the moistureproofed type. If the film has been moistureproofed on both of its surfaces, the moistureproofing coating imposes itself between the backing proper and the adhesive layer and thus fortuitously occupies the position of a primer coat upon the former but it is in general neither harmful nor helpful with respect to the firm anchorage of the adhesive coating to the backing.

The utility of films of cellulose esters and cellulose ethers as backing material for the adhesive coatings of this invention is limited by the sensitiveness of such cellulose derivatives to many of the solvents and plasticizers which may be used in these coatings. Obviously, a softening of such a backing by the action of a component of the adhesive composition will lead to mechanical difficulties. Therefore, when a transparent base is required, regenerated cellulose will usually be selected rather than an ester or ether of cellulose. Glassine paper may be used as a substitute for regenerated cellulose, but is inferior in appearance and strength.

An advantage of the present invention is that it provides a pressure-sensitive adhesive fabric especially adapted for household and office use as well as for application to glass to prevent its shattering when broken by concussion. The adhesive fabric of the present invention is also well suited for use as a masking paper in the temporary protection of delicate surfaces. A further advantage of the invention is that it provides an adhesive composition that is strongly cohesive as well as adhesive and is highly resistant to the deteriorating influence of atmospheric conditions.

As many apparently widely different embodiments of this invention may be made without departing from the spirit and scope thereof, it is to be understood that the invention is not limited to the specific embodiments thereof except as defined in the appended claims.

I claim:

1. A pressure-sensitive adhesive fabric comprising a backing material and deposited thereon a pressure-sensitive adhesive coating comprising 100 parts, by weight, of a resin base consisting of a polyvinyl butyral resin having a content of 0%–5% polyvinyl ester and 8%–13% polyvinyl alcohol, and, as a second component of said resin base, not in excess of 50%, by weight of said polyvinyl butyral resin, of polyvinyl acetate, and 67–230 parts of an active, solvent plasticizer for the polyvinyl butyral resin.

2. A pressure-sensitive adhesive fabric comprising a backing material and deposited thereon a pressure-sensitive adhesive coating comprising 100 parts, by weight, of a resin base consisting of a polyvinyl butyral resin having a content of 0%–5% polyvinyl ester and 8%–13% polyvinyl alcohol, and, as a second component of said resin base, not in excess of 50%, by weight of said polyvinyl butyral resin, of polyvinyl acetate, and 100–150 parts of an active, solvent plasticizer for the polyvinyl butyral resin.

3. A pressure-sensitive adhesive fabric comprising a backing material and deposited thereon a pressure-sensitive adhesive coating comprising 100 parts, by weight, of a resin base consisting of a polyvinyl butyral resin having a content of 0%–5% polyvinyl ester and 8%–13% polyvinyl alcohol, and, as a second component of said resin base, not in excess of 50%, by weight of said polyvinyl butyral resin, of polyvinyl acetate, and 67–230 parts of dibutyl phthalate.

4. A pressure-sensitive adhesive fabric comprising a backing material and deposited thereon a pressure-sensitive adhesive coating comprising 100 parts, by weight, of a resin base consisting of a polyvinyl butyral resin having a content of 0%–5% polyvinyl ester and 8%–13% polyvinyl alcohol, and, as a second component of said resin base, not in excess of 50%, by weight of said polyvinyl butyral resin, of polyvinyl acetate, and 100–150 parts of dibutyl phthalate.

GELU STOEFF STAMATOFF.